March 2, 1926.
T. A. JANSSON
1,574,894
ADJUSTABLE TRIPOD OR OTHER SUPPORT
Filed Feb. 24, 1925
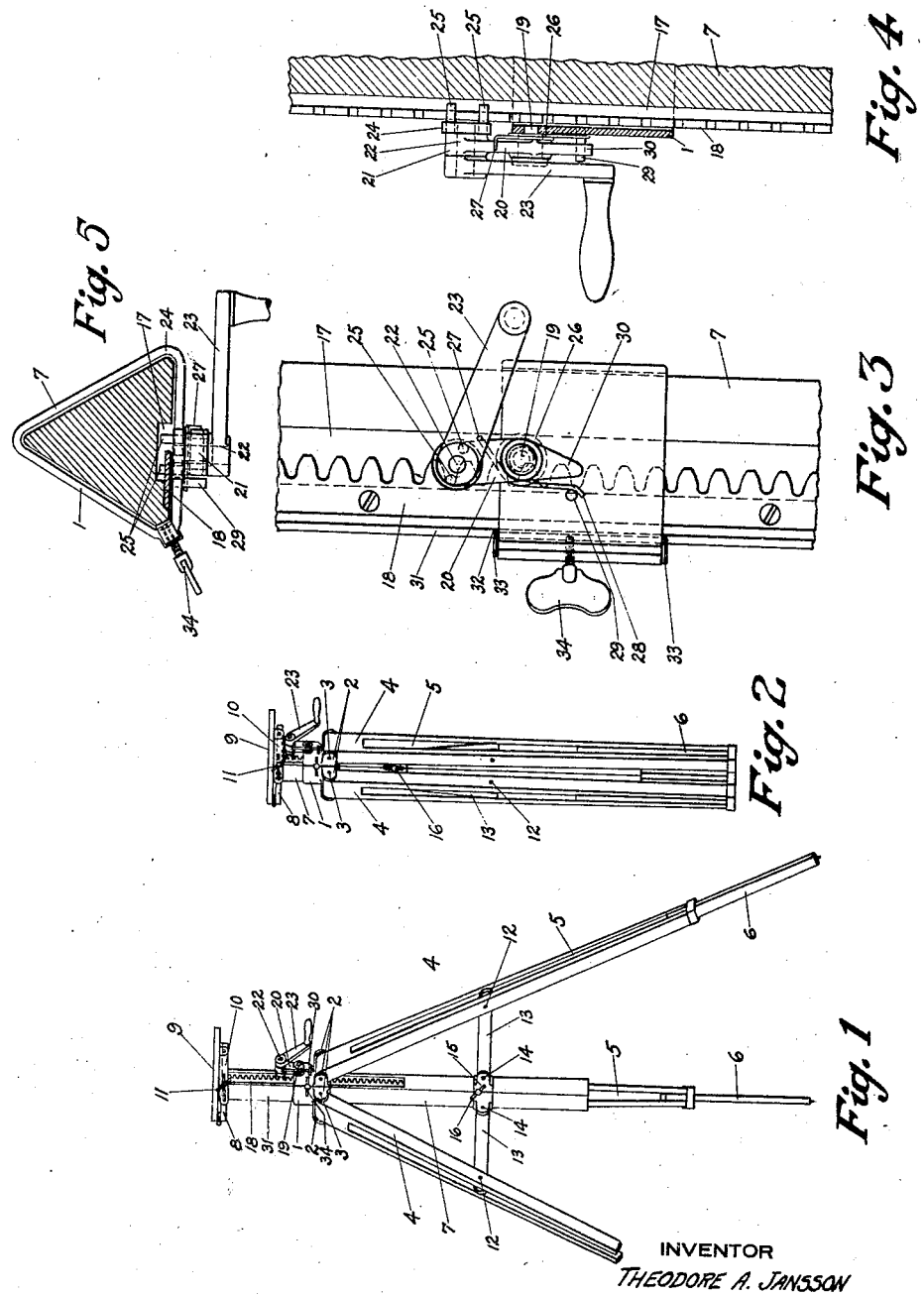
INVENTOR
THEODORE A. JANSSON
BY
Philip S. Hopkins
ATTORNEY Patented Mar. 2, 1926.

1,574,894

UNITED STATES PATENT OFFICE.

THEODORE A. JANSSON, OF JOHNSON CITY, NEW YORK, ASSIGNOR TO ANSCO PHOTO-PRODUCTS, INC., OF BINGHAMTON, NEW YORK.

ADJUSTABLE TRIPOD OR OTHER SUPPORT.

Application filed February 24, 1925. Serial No. 11,216.

To all whom it may concern:

Be it known that I, THEODORE A. JANSSON, a citizen of the United States, and a resident of Johnson City, county of Broome, and State of New York, have invented certain new and useful Improvements in Adjustable Tripods or Other Supports, of which the following is a description, reference being had to the accompanying drawing, which forms a part of this specification.

My invention relates to stands or tripods and is particularly adapted as an adjustable support for photographic cameras although it will be readily understood that the same may be advantageously used in many other arts, wherein an adjustable element is desired.

More particularly it is an object of my invention to provide an adjustable member which may be raised or lowered in its supporting positions and which is automatically locked in any set position.

Another object is to provide a novel means for raising and lowering or otherwise adjusting the supporting element.

It is also an object to provide a new shifting mechanism with automatic locking means adaptable to a variety of uses and devices.

A further object is to provide a stand or support which is sturdy in construction and rigid and free from vibration in operation.

A still further object is to provide a combined operating and automatic locking device for manipulating the support.

Still further another object is to provide a tripod or other support of the character described which is easy and smooth in operation, light in weight, and which enables the user to quickly assemble or dismantle. Many other objects and advantages in details of construction and operation will be apparent as the description proceeds, reference being had to the accompanying drawing wherein like reference numerals indicate like parts.

In the drawing:

Figure 1 illustrates a tripod unfolded and set up ready for use.

Figure 2 shows the tripod in its collapsed or folded position.

Figure 3 is a detail showing clearly the operating and locking device.

Figure 4 is a detail partly in section showing the operating part in locking position.

Figure 5 is a cross sectional view showing the operating device in still another position.

These figures all illustrate the use of my invention with a tripod support. Obviously the same shifting mechanism is equally adaptable to any other form of support or other device requiring adjustment of position.

A sleeve or hollow casting 1 is provided on its lower edge on each of its sides, preferably three or more, with outstanding ears or lugs 2, forming bearings for the pivots 3, mounted in the upper ends of legs 4. The legs 4 are slotted as at 5, such slots forming a slideway for extensions 6 suitably secured therein whereby added length may be had for the legs when desired.

Slidable through the hollow casting or sleeve, is a supporting member 7 on the top of which is adjustably mounted the table or platen 8 preferably provided with hinged supporting surface 9 which through the medium of a pivoted, slotted bracket 10 and wing nut or set screw 11, may be tilted upwardly and secured at any desired angle. This table or platen is adapted to receive, as by screws or other suitable means, a photographic camera or other instrument such as surveying instruments, etc., which it may be desired to support.

It will be understood, too, that any other means of support than the legs 4 is equally well adapted for use with my invention, as for instance a single support, sleeve, cylinder, base or bracket in which the adjustable member 7 moves.

Pivoted intermediate the ends of legs 4, as at 12, are the outer ends of links 13, pivoted also at their inner ends to ears 14 carried by a second sleeve, also preferably a hollow casting 15 of aluminum or other light material, slidable up and down the supporting member 7. A set screw 16 provides means for locking the sleeve 15 at any desired point on the member 7. The links 13 and the sleeve 15 lend rigidity to the legs 4 when in unfolded or operative position, and in addition permits adjustment of said legs toward and away from the member 7, thus enabling use of the tripod under varying conditions and circumstances of space, in which it may be required to set up the tripod. This arrangement also provides an additional means for adjusting the height to which the tripod may be set.

A channel 17 is cut in one side of the member 7, extending downwardly from the top a substantial distance. A toothed rack 18 is suitably mounted adjacent this channel with the teeth of said rack projecting therein. Pivoted to the casting 1 as at 19 is an arm 20 provided at its upper end with a bearing 21 in which is rotatably mounted a pin or stub shaft 22 provided its outer end with a handle or crank 23 and at its inner end with a disc 24 carrying two diametrically opposed pins 25 for engagement with the teeth of the rack 18 within the channel 17.

A tension spring 26 is coiled about the pivot 19 between the arm 20 and the casting 1 and has one end 27 bearing against one side of the arm 20 in a manner to normally exert its tension to throw said arm 20, with its attendant parts just described, to the left in Figure 3, whereby the pins 25 will be normally held in engagement with the teeth of the rack 18. The opposite end 28 of the spring is anchored against a pin 29, carried by the casting 1, said pin also serving to limit the movement of the arm 20 outwardly or away from the rack 18, by lying in the path of the lower depending end 30 of said arm.

One corner of the supporting member 7 is flattened as at 31 and between this flattened corner and the adjacent corner of the casting 1 is interposed a flat strip 32 of soft metal or other suitable material, the protruding ends 33 thereof being bent outwardly to prevent accidental displacement of the same. A set screw 34 is threaded through this corner of the casting 1 for engagement with the strip 32 whereby the supporting member 7 may be, if desired, locked in any given position. This additional locking means however is usually unnecessary for as will be readily understood from the foregoing description, the pins 25 simultaneously engaging adjacent teeth of the rack when the handle 23 is in the position shown in Figure 4, or extending vertically upward, automatically and effectively lock the member 7 against movement in either direction.

The operation of my invention is as follows:

Assuming that the tripod or whatever form the support may take is in the position shown in Figure 2, that is folded up for convenience in carrying it, and it is desired to set up the apparatus for use, the operator first loosens the set screw 16 carried by the sleeve or casting 15 and pivots the legs 4 outwardy to the desired distance. If greater height is desired, the slidable sections 6 may be pulled outwardly as shown in Figure 1, and suitably locked or secured in such position. With the camera or other instrument to be used secured on the platen 9, it is now desired to raise or lower the member 7 to the exact height required. To do this, all that is necessary is for the operator to grasp the handle or crank 23, rotating the same to the right or left depending upon whether it is desired to raise or lower the support. Upon rotation of the crank, the disc 24 carrying the pins 25 will be rotated and said pins will alternately engage with the adjacent teeth of the rack 18, thus raising or lowering said rack and consequently the supporting member 7. Due to the fact that the pins 25 are eccentrically mounted with respect to the shaft 22, the arm 20 carrying the crank 23 will rock outwardly or to the right in Figure 3, upon each rotation of the crank. One of the pins 25 however will at all times engage with the rack 18, the pin 29 cooperating with the depending end 30 of the arm 20 to prevent the upper end of the arm 20 to rock outwardly a sufficient distance to permit both pins being disengaged with the rack at the same time. Furthermore, the spring 26 automatically throws the arm 20 to the left in Figure 3 as soon as the operator releases the handle or crank 23. Figures 3 and 5 show the position of the parts as the handle is being turned to raise or lower the member 7, while Figure 4 shows the parts in their locked position. It will be understood of course that this locking action is the same whether the handle is raised vertically from its pivot 21 or in the position shown in Figure 4, it being merely necessary that both pins 25 be engaged at the same time with adjacent teeth. Both the weight of the instrument carried by the supporting member 7 and the tension of the coil spring 26 act to automatically throw the pins to such locking position in the event that the operator releases the handle at any other point in its rotation. This new shifting mechanism is as above shown, particularly well adapted for use with an adjustable tripod or other support. Obviously, it is not limited to such use however, but is applicable to any device in which adjustment or changing the position of an element and automatically locking it in adjusted position, is desired.

After the desired adjustment has been made, as to the height of the supporting member 7, the set screw 16 should be locked to prevent accidental spreading or other displacement of the legs 4, and also if desired, the set screw 34 may be locked as an additional safeguard against accidental displacement of the supporting member 7.

It will be clear from the foregoing that I have devised a novel, practical, simple and inexpensive tripod or other support which permits all of the adjustments necessary to a support of this character, such adjustments being smooth and simple in operation and automatically locked in adjusted positions, as well as providing additional or supplementary manually operated locks as an extra safeguard. Although I have described my invention as being particularly adaptable as a support for a photographic camera, it will be understood that the same is susceptible for a wide variety of uses, and I do not limit myself therefore either to such use, nor to the exact structure shown and described, the same being the preferred embodiment only, other than by the appended claims.

I claim:

1. Shifting mechanism comprising a support and including an adjustable member provided with teeth, means for adjusting the position of said member comprising a pivoted element rockable toward and away from said teeth, and a rotatable element carried by said pivoted element and having means for engaging said teeth.

2. Shifting mechanism comprising a support, an adjustable member provided with teeth, means for adjusting the position of said member including an element pivoted to said support and rockable toward and away from said teeth, rotatable means carried by said pivoted element and engaging said teeth, and means for normally forcing said pivoted element toward said teeth.

3. Shifting mechanism comprising a support, an adjustable member provided with teeth, means for adjusting the position of said member including an element pivoted to said support and having a limited movement toward and away from said teeth, rotatable means carried by said pivoted element and engaging said teeth, and a spring normally forcing said pivoted element toward said teeth.

4. Shifting mechanism comprising a support, an adjustable member provided with teeth, means for adjusting the position of said member including an arm pivoted to said support and having a limited movement toward and away from said teeth, a disk rotatably carried by said arm and provided with pins engaging said teeth, and a spring normally forcing said arm toward said teeth.

5. A tripod comprising legs secured at one end to a sleeve, a supporting element adjustable through said sleeve, teeth on said element, a pivoted arm on said sleeve, independently rotatable means carried by one end of said arm and engaging said teeth for adjusting the position of said supporting element, said means including pins parallel to the axis of said means, and spring means normally forcing said pins into simultaneous engagement with adjacent teeth.

6. A tripod comprising legs secured at one end to a sleeve, a supporting element adjustable through said sleeve, teeth on said element, a pivoted arm on said sleeve, independently rotatable means carried by one end of said arm, and engaging said teeth for adjusting the position of said supporting element, said means comprising diametrically opposed pins, and a spring for normally forcing said pins into simultaneous engagement with adjacent teeth and for preventing disengagement of all of said pins at the same time.

7. A tripod comprising legs secured at one end to a sleeve, a supporting element adjustable through said sleeve, teeth on said element, an arm pivoted to said sleeve and carrying at one end an independently rotatable member provided with two diametrically opposed parallel pins for engagement with said teeth, and spring means for normally pivoting said arm in a manner to hold said pins in simultaneous engagement with adjacent teeth on said supporting element whereby the same is held in adjusted position.

THEODORE A. JANSSON.